July 7, 1959 B. F. MILLER ET AL 2,893,810

RECORDER MECHANISM

Filed Jan. 3, 1958 2 Sheets-Sheet 1

Burton F. Miller
William H. Fiden
INVENTORS
Allen E. Botney, Agent
BY Morris Spector,
ATTORNEY Burton F. Miller
William H. Fiden
INVENTORS
Allen E. Bothey, Agent
BY Morris Spector,
ATTORNEY

United States Patent Office

2,893,810

Patented July 7, 1959

2,893,810

RECORDER MECHANISM

Burton F. Miller, Pacific Palisades, and William H. Fiden, Torrance, Calif., assignors, by mesne assignments, to Thompson Ramo Wooldridge Inc., Cleveland, Ohio, a corporation of Ohio

Application January 3, 1958, Serial No. 706,962

21 Claims. (Cl. 346—74)

The present invention relates in general to recorder apparatus and more particularly to an electrochemical type of recorder device that is able to record information at relatively high speeds by simultaneously recording the information on a multiple of lines.

The speed with which information may be transmitted is largely limited by the speed with which the information can be recorded at the place of reception. This has been notably true in the fields of Teletype communications and facsimile recording.

In the area of Teletype communications, each character of information, such as a letter of the alphabet, is customarily reduced to a binary coded form comprising a permutation of marks and spaces which are transmitted sequentially. Accordingly, before a character can be recorded at the receiving end, the system must await the receipt of the entire mark and space permutation, which necessarily sets an upper limit on the transmittal rate of information. Furthermore, the practice in the past has been to record the characters by means of type face mounted on hammer devices, very much in the manner of an ordinary typewriter. In general, such a method involves mechanical translation of type characters from a storage region to the printing position and subsequent return of the characters to storage which further limits the recording speed. In addition, considerations with respect to the mass of the type characters and their acceleration during the printing operation indicate that such a method is not well adapted for very high-speed printing applications.

Facsimile recording is used for picture transmission although other types of information such as, for example, the character mentioned above in connection with Teletype communications, may also be transmitted by this technique. In general, the picture is scanned one line at a time, the variations of light intensity being converted to corresponding variations of voltage. At the receiver end, the varying voltage is applied between a pair of metal electrodes positioned on opposite sides of electrochemical paper. One electrode is in the form of a knife edged bar which extends transversely across the paper and is in contact therewith. The other electrode is oriented to intersect the first electrode and is moved in such a way that the point of intersection between the two electrodes scans the electrolytic paper at the same rate that the picture was scanned at the transmitter end. Consequently, the magnitude of the voltage impressed across the electrodes and, therefore, the density of the metallic salt pigment electrolytically deposited on the electrochemical paper in response to the electrode voltage, varies across the electrolytic paper in the same manner as the intensity of the light in the scanned line at the original picture.

Several lines are precluded from being recorded simultaneously because the size of the iron bars prevents several of these bars from being grouped together closely enough to permit the large number of lines per inch required for a faithful reproduction of the picture. Accordingly, the speed with which the picture is reproduced is limited to one line at a time. Moreover, the knife-edged electrode is gradually eroded away by the electrolytic action of supplying metal ions and, therefore, must be periodically dismantled and replaced. Aside from any inconvenience that may be involved and aside from the fact that the system is not available for use during the replacement period, it will also be recognized that the fidelity with which the intelligence is recorded, whether it be picture or character, is continuously reduced during the erosion process.

It is, therefore, an object of the present invention to provide a recorder device that permits information to be transmitted at relatively greater speeds by simultaneously recording the received information on a multiple of lines.

It is another object of the present invention to provide a recorder device that substantially increases the permissible rate at which information may be recorded by having relatively few moving parts.

It is a further object of the present invention to provide an electrochemical recorder device that continuously renews the recording pigment source so that information is at all times recorded with a relatively high degree of fidelity.

It is still another object of the present invention to provide a recorder device that sequentially records printed text in such a manner that each character is completely recorded before printing of the next character is started.

The present invention obviates the above-mentioned disadvantages and limitations of prior art recorder devices by providing an electrochemical type of recorder device that permits a plurality of closely-spaced metal electrodes to be brought into contact with the electrolytic paper, as a result of which a pigment may be simultaneously deposited on a plurality of lines on the paper because of the electrolytic action between the paper and each of the electrodes. In the preferred embodiment of the invention the electrodes are of iron or stainless steel so that the pigment formed on the paper is an iron salt, the electrodes being automatically, gradually and continuously replaced to prevent diminution of the iron ion source. More particularly, a plastic ribbon is provided in which are imbedded a plurality of metal wires, the ribbon-wire combination being flexible enough to be wound on spools and used in the same manner as a typewriter ribbon.

With respect to Teletype communications, the multi-electrode ribbon is used in conjunction with several banks or assemblies of electrodes positioned on the opposite side of the electrolytic paper from the ribbon, the number of electrode assemblies being equal to the maximum number of characters that may be printed in a line across the paper. Furthermore, the electrode assemblies are oriented in such a manner relative to the wire electrodes that a printing matrix is located at each character position. When marks and spaces representing a character are received, the appropriate electrodes on both sides of the electrochemical or electrolytic paper are energized so as to cause iron salts to be deposited on the paper in the form of the desired character.

Since there are no moving mechanical parts (the only mechanical movement is the advance of the paper after each line is recorded and the relatively infrequent unraveling of the ribbon as the iron erodes) and, further, since matrices of the type described permit each character to be completely recorded before the next character is started, it will be readily seen that higher recording speeds may be obtained which, in turn, permit the information to be teletyped at a faster rate.

In the field of facsimile recorders, the wire-imbedded ribbon now makes it possible to position a plurality of closely spaced electrodes adjacent the recording medium with the result that a corresponding plurality of lines of picture information may now be simultaneously recorded without any loss in picture subtlety or fidelity. Since this is true, the picture at the transmitter end may now be scanned along a number of lines or, stated differently, more information may now be transmitted per unit of time than heretofore practical. The fidelity of the reproduced picture is further enhanced by the fact that, as previously mentioned, the electrodes are replaced before the reduction in their iron ion concentration can have any noticeable effect.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only and are not intended as a definition of the limits of the invention.

Figure 1:
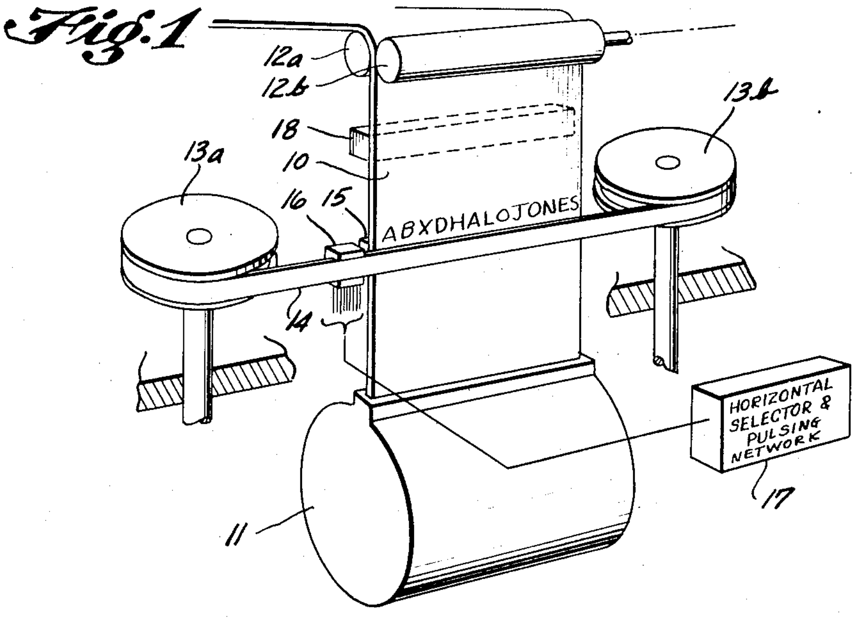
Figure 1 is an isometric sketch of a recorder mechanism according to the present invention.

Referring now to the drawings, an electrochemical type of recorder according to the present invention is shown in Figure 1 and, as shown, the recorder includes electrochemical paper 10 which must be maintained in a moist condition during the actual printing or recording period and, therefore, is fed from a humidor 11. The paper extends from the humidor to and between a pair of rollers 12*a* and 12*b* which are driven so as to move the paper from one recording position to the next.

A pair of spools 13*a* and 13*b* is rotatably mounted intermediate humidor 11 and rollers 12*a* and 12*b*, paper 10 being disposed between the spools in the manner shown in the figure. A tape or ribbon 14, in which are partially imbedded a plurality of wire electrodes, is wound on spools 13 and 13*b*, the portion of the ribbon between the spools extending transversely across the paper and contiguous thereto. Thus, by way of example, if paper 10 is moved in a vertical direction, then ribbon 14 extends horizontally across the width of the paper. The wire electrode side of the ribbon is nearest the paper and, as will be more clearly seen from subsequent figures, the wire electrodes are parallel-spaced and extend longitudinally along ribbon 14 between the ends thereof.

On the other side of paper 10 there is positioned an electrode arrangement 15 which, in the case of Teletype communications, forms a printing matrix at each character location in a line and, in the case of a facsimile recorder system, forms a point of intersection with each wire electrode, the several points of intersection moving as a group across the width of paper 10. The preferred electrode arrangements both for Teletype communications and facsimile recorders will be more fully described below.

Electrical signals representing the information to be recorded are selectively applied to the wire electrodes of ribbon 14 by means of a sliding contact device 16 which is fixed in position preferably between spool 13*a* and paper 10. Device 16 includes a plurality of conductive elements equal in number to the wire electrodes, each wire electrode being in frictional or sliding contact with an associated one of the conductive elements. The conductive elements are individually connected to an electrical signal source 17 which will hereafter be referred to as a horizontal selector and pulsing network. This network determines which wire electrode is to be energized and then applies a voltage pulse thereto. A network that may be adapted by one skilled in the art for use as horizonal selector and pulsing network 17 is shown and described on pages 182 through 185 of an article entitled "Digital Printer Boosts Readout Time," by H. W. Gettings, in Electronics, June 1957 issue.

Finally, although not pertinent to the invention, it should be mentioned that a heater apparatus, designated 18, is positioned adjacent paper 10 between ribbon 14 and rolls 12*a* and 12*b*, for the purpose of heating the paper before it is pulled through the rollers.

Figure 2:
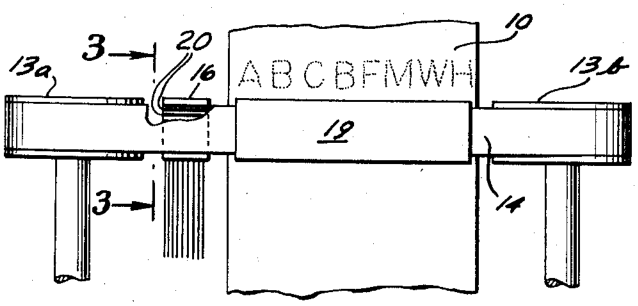
Figure 2 is a front view of a portion of the mechanism shown in Figure 1.
Figure 3:
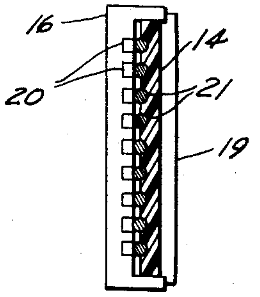
Figure 3 is a cross-sectional view of the portion shown in Figure 2 taken along the lines 3—3.
Figures 4, 5:
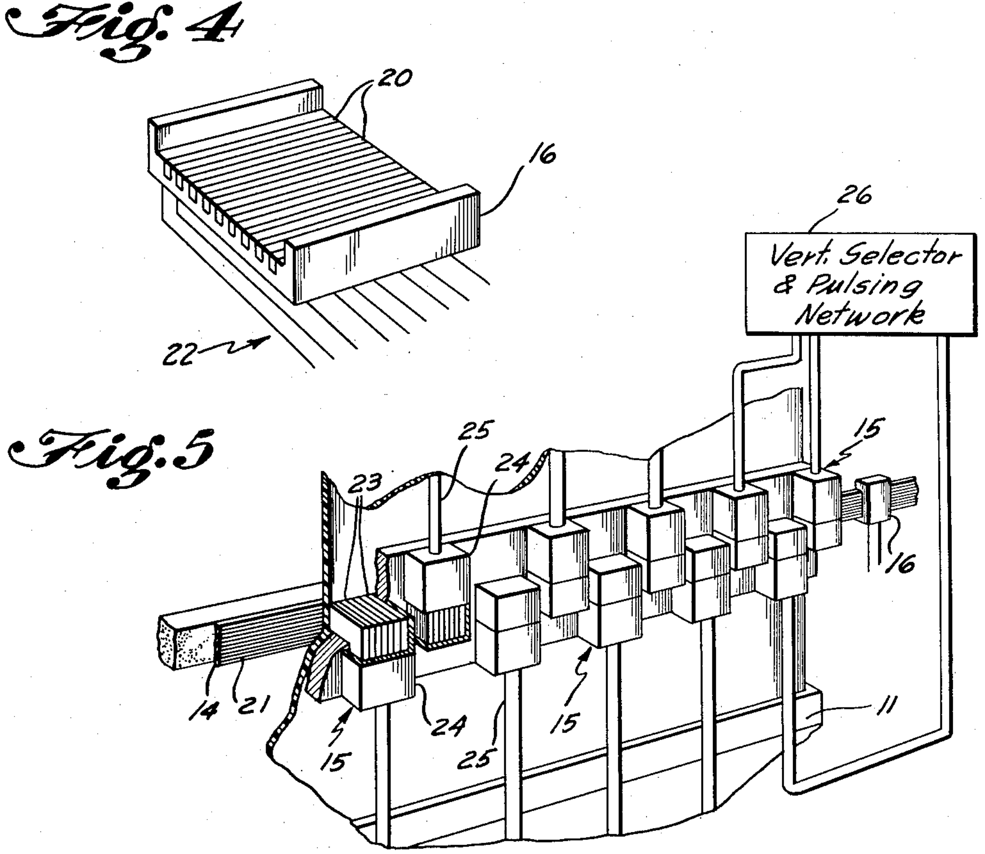
Figure 4 is an isometric view of the sliding contact device shown in Figures 1, 2 and 3.
Figure 5 is a view of the electrodes arrangement that may be used in Teletype communications and illustrates the printing matrix for each character location.

Referring now to Figures 2, 3 and 4, ribbon 14 and contact device 16 and the relation therebetween are shown in greater detail than heretofore. Thus, in Figure 2 the ribbon is partly broken away to expose the conductive elements of the contact device, the conductive elements being designated 20. As seen, they are parallel spaced like the wire electrodes of ribbon 14 and preferably extend across the entire width of the device to ensure good electrical contact with the aforesaid wire electrodes. A cross-sectional view of ribbon 14 and contact device 16 which clearly illustrates the relation of conductive elements 20 and the wire electrodes, designated 21, is shown in Figure 3. As shown therein, wire electrodes 21 are only partially imbedded in ribbon 14 which is preferably made of plastic, the unimbedded sector of each wire electrode being in electrical contact with the associated one of conductive elements 20. The separate electrical connection from network 17 in Fig. 1 to each conductive element is also clearly indicated in Fig. 3 by wire leads which are generally designated 22. A better overall view of device 16 showing conductive elements 20 mounted therein and wire leads 22 connected thereto is obtained in Fig. 4.

Referring now to Fig. 5, there is shown the electrode arrangement that may, in accordance with the present invention, be utilized in a Teletype communications system. As shown therein, ribbon 14 containing wire electrodes 21 is disposed on one side of electrochemical paper 10 and on the other side of the paper, facing ribbon 14, there are mounted a plurality of groups or assemblies of electrodes, each group or assemblage of electrodes being generally designated 15 as in Fig. 1. The individual electrodes in each assembly are designated 23 and are preferably oriented so that the plane of each electrode 23 intersects wire electrodes 21 at right angles. Thus, since the plurality of electrode assemblies 15 are linearly disposed across the width of paper 10, the combination of electrodes 23 in each assembly 15 and wire electrodes 21 forms a printing matrix at each position on the paper where a character may be printed.

Each assembly 15 also includes an electrical connector 24 mounted over electrodes 23 and in electrical connection therewith, a cable 25 extending from each connector 24 by means of which electrodes 23 are individually connected to an electrical signal source 26 which will hereinafter be referred to as a vertical selector and pulsing network. This network selects each assembly 15 in turn and then successively selects each electrode 23 in the selected assembly, the network then energizing the electrode selected by applying a voltage pulse thereto. A network that may be adapted for use as vertical selector and pulsing network 26 is also shown and described in the previously mentioned article by H. W. Gettings published in the June 1957 issue of Electronics.

It should be noted that although the matrix at each character location is shown in the figures to be formed by nine horizontal electrodes 21 and seven vertical electrodes 23, the choice of a seven-by-nine matrix is arbitrary and represents only a useful compromise between a noticeably coarse grained effect that would be produced due to a smaller number of electrode elements and an increased bulk of associated circuitry that would be required with a larger number of such elements. It should be emphasized, however, that a matrix of the type described may be formed with any number of horizontal and vertical electrode elements.

Figure 6:
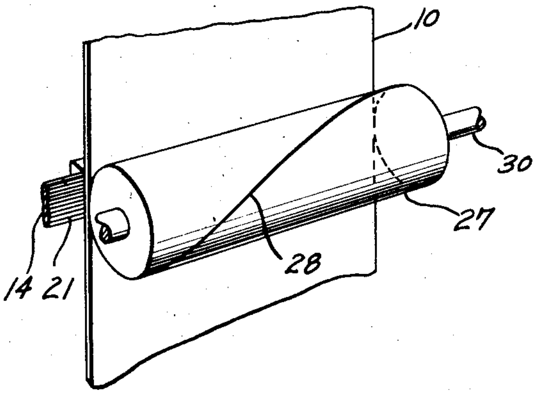
Figure 6 is a view of the electrode arrangement that may be used in facsimile recorders.

In Fig. 6 there is shown the electrode arrangement that may be utilized in a facsimile recorder system. Since ribbon 14 and wire electrodes 21 imbedded therein as well as the position of the ribbon and electrodes relative to paper 10 are identical as heretofore described in connection with Figs. 1 to 5, no further description thereof is deemed necessary here.

On the side of paper 10 opposite to that of electrodes 21, however, the electrode apparatus comprises a cylinder 27 and a skewed conductive element 28 partially imbedded in the surface of the cylinder and preferably extending from one end of the cylinder to the other. The degree to which electrode 28 is skewed is preferably such that in going from one end of the electrode to the other end it traces a path half way around the perimeter of the cylinder. Stated differently, the points of intersection between electrode 28 and the directrices at the ends of cylinder 27 are preferably 80° apart measured around the cylinder. It should be noted again, however, that the degree of skewing described above is only the preferable one and that other degrees of skewing for electrode 28 are equally feasible.

Considering cylinder 27 and electrode 28 thereon still further, the cylinder is rotatably mounted on a shaft 30 which is positioned parallel to ribbon 14 and sufficiently close to paper 10 so that the cylinder is contiguous to the paper. Accordingly, the portion of electrode 28 that is closest to paper 10 at any one time may be said to intersect wire electrodes 21 and, when the cylinder is caused to rotate, all the points of intersection periodically move as a group horizontally across the width of the paper.

In describing the operation, the recorder mechanism of the present invention as it is adapted for Teletype transmission will be taken up for consideration first. Accordingly, the discussion of the operation will involve the electrode matrix arrangement shown in Fig. 5.

Upon receipt of a permutation of marks and spaces representing a particular character of information and to print that character, appropriate horizontal wire electrodes 21 are energized by means of voltage pulses by horizontal selector and pulsing network 17 and, simultaneously, vertical electrodes 23 at the selected line position are sequentially energized by vertical selector and pulsing network 26. As a result, current is caused to pass through the paper at the intersections of the energized horizontal and vertical electrodes. The current brings about the deposition of iron salts on the paper in the form of dots, the several dots combining to form the desired character.

Figure 7:
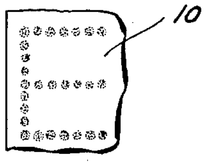
Figure 7 is an illustration of a letter of the alphabet recorded in accordance with the present invention.

A character printed in the above described way is shown in Fig. 7 and, by the way of example, the character shown is the letter "E." Thus, to print the letter "E" in response to the received electrical signals representing this letter of the alphabet, vertical electrodes 23 in electrode assembly 15 at the selected line position are energized in succession, all nine horizontal electrodes 21 being energized during the energization of the first vertical electrode and the first, fifth and ninth horizontal electrodes being energized during the energization of each of the remaining vertical electrodes. It will thus be seen from Fig. 7 that the iron ions contained in horizontal wire electrodes 21 are caused by electrolytic action to combine with the chemicals on the paper to form iron salts which deposit in the form of dots at the various intersections of the simultaneously energized horizontal and vertical electrodes. The several dots combine to form the letter "E."

It will be recognized that when the printing of one character of information is completed, the recorder will then proceed to print the next received character in the next character position and this sequence continues until an entire line of information is recorded, at which time paper 10 is advanced to the next recordation line. It will also be recognized that since horizontal electrodes 21 supply the iron ions which are deposited on the paper, electrodes 21 will therefore be subject to deterioration and will have to be periodically replaced. In accordance with the present invention, the replacement is accomplished by moving ribbon 14 very slowly across the width of paper 10 during the printing process. The velocity at which the ribbon and, therefore, electrodes 21, is moved is determined by the recording rate and can be adjusted so that the density of the recorded characters is relatively constant throughout the paper.

Considering now the operation of the recorder mechanism of the present invention as it is adapted for facsimile recording, reference is made to Fig. 6 where such an adaptation is illustrated.

Since the rotation of cylinder 27 causes the points of intersection between skewed electrode 28 and horizontal wire electrodes 21 to traverse the width of paper 10 at a uniform speed, when electrical signals representing the transmitted picture data are simultaneously applied to each of the wire electrodes, thereby producing differences of potential between electrode 28 and electrodes 21 at their points of intersection, iron salts are formed in the manner previously described throughout the entire printing width of paper 10 at the abovesaid intersections.

The density of the iron salt deposits will vary from point to point on each of the several lines being recorded in accordance with the amplitude variations of the applied electrical signals and, since the amplitudes, in turn, faithfully correspond to the light intensities found along the several lines being scanned at the original picture, the picture ultimately recorded is a faithful reproduction of the original. As mentioned before, the fidelity of the reproduction is further enhanced by the fact that new supplies of iron ions are constantly being supplied through the movement across the paper of ribbon 14 and electrodes 21 which contain the iron ions.

It should be noted again for emphasis that the ribbon and wire electrode arrangement constituting a part of the present inventive combination makes it possible to record several lines of data simultaneously and, therefore, permits higher data transmission rates.

It should also be noted that modifications of the ribbon-wire arrangement may be employed in the recorder with equally good effect. Thus, for example, an insulative element on which lines of metal ion sources are mounted, a printed circuit type of arrangement, may be used. Also, reduced to fundamentals, the wires alone could be used without any backing member for them.

Finally, with respect to the wires, it should be mentioned that although iron-containing wires, such as stainless steel, have been indicated as being preferred, wires of any other metal or metal alloy may be utilized just as well for forming visible pigments on the recording medium.

Having thus described the invention, what is claimed is:

1. A recorder for printing information on an electrochemical printing medium in response to electrical signals representing the information, said recorder comprising: an insulative element having at least two lines of current-conductive material mounted thereon, said element being positioned in such a manner that said lines are contiguous to one surface of the printing medium; electrode means positioned contiguous to the other surface of the printing medium and of such configuration and orientation as to form a plurality of points of intersection with said conductive lines at each position on the printing medium whereat information is to be printed; and means for selectively energizing said lines of current-conductive material and said electrode means in accordance with the applied electrical signals, electrical current being caused to flow between said energized lines of conductive material and said electrode means at the points of intersection thereof, whereby a visible pigment is formed on the printing medium at the last-mentioned points of intersection to print the information corresponding to the electrical signals.

2. The claim defined in claim 1 wherein said current-conductive lines include an iron-containing material.

3. A recorder for printing information on an electrochemical printing medium in response to electrical signals representing the information, said recorder comprising: at least two metal wires positioned contiguous to one surface of the printing medium; electrode means positioned contiguous to the other surface of the printing medium and of such configuration and orientation as to form a plurality of points of intersection with said wires at each position on the printing medium whereat information is to be printed; and means for selectively energizing said wires and electrode means in accordance with the applied electrical signals, electrical current being caused to flow between said energized wires and electrode means at the points of intersection thereof, whereby visible metal salts are deposited on the printing medium at the last-mentioned points of intersection to print the information corresponding to the electrical signals.

4. A recorder for printing information on an electrochemical printing medium in response to electrical signals representing the information, said recorder comprising: a ribbon made of an insulative material and having partially imbedded therein a plurality of metal wires extending between the ends of said ribbon, said ribbon being positioned in such a manner that said wires are contiguous to one surface of the printing medium; electrode means positioned contiguous to the other surface of the printing medium and of such configuration and orientation as to form a plurality of points of intersection with said ribbon wires at each position on the printing medium whereat information is to be printed; and means for selectively energizing said ribbon wires and electrode means in accordance with the applied electrical signals, electrical current being caused to flow between said energized wires and electrode means at the points of intersection thereof, whereby visible metal salts are deposited on the printing medium at the last-mentioned points of intersection to print the information corresponding to the electrical signals.

5. The recorder defined in claim 4 wherein said energizing means includes a signal source having a plurality of output terminals equal in number to said plurality of wires and operable in response to the applied electrical signals for selectively producing permutations of voltage pulses at said output terminals corresponding to the information to be recorded, said energizing means further including a contact device having a plurality of conductive elements mounted thereon, one conductive element for each wire, said device being interposed between said signal source and said wires for electrically coupling said wires to the output terminals, respectively, of said source.

6. A recorder for printing information on an electrochemical printing medium in response to electrical signals representing the information to be printed, said recorder comprising: a ribbon made of an insulative material and having partially imbedded therein a plurality of metal wires extending between the ends of said ribbon, said ribbon being positioned in such a manner that said wires are contiguous to one surface of the printing medium and disposed transversely across the width thereof; drive means for moving said ribbon across the width of the printing medium at a predetermined rate corresponding to the speed at which information is recorded; electrode means positioned contiguous to the other surface of the printing medium and of such configuration and orientation as to form a plurality of points of intersection with said ribbon wires at each position on the printing medium whereat information is to be printed; and means for selectively energizing said ribbon wires and electrode means in accordance with the applied electrical signals, electrical current being caused to flow between said energized wires and electrode means at the points of intersection thereof, whereby visible metal salts are deposited on the printing medium at the last-mentioned points of intersection to print the information corresponding to the electrical signals.

7. The recorder defined in claim 6 wherein said drive means includes supply and take-up reels rotatably mounted adjacent the sides of the printing medium and having said ribbon wound thereon and extending therebetween across the printing medium, said drive means also including motor means for rotating at least one of said reels to move said ribbon at the predetermined rate.

8. A recorder for printing characters on an electrochemical printing medium in response to applied electrical signals representing the information, said recorder comprising: a ribbon made of an insulative material and having partially imbedded therein a plurality of wire electrodes extending longitudinally between the ends of said ribbon, said ribbon being positioned in such a manner that said wire electrodes are contiguous to one surface of the printing medium; an electrode assembly positioned contiguous to the other side of the printing medium at each character space available in a line thereon, each such assembly including a plurality of electrodes oriented in such a manner relative to said wire electrodes as to form a printing matrix therewith; and means for selectively energizing said wire electrodes and the electrodes in each of said electrode assemblies in accordance with the applied electrical signals, electrical current being caused to flow between said energized wire and assembly electrodes in response to the energization thereof, whereby a visible metal salt pigment is deposited at the selected character space on the printing medium in the form of the character to be recorded.

9. The recorder as defined in claim 8, said recorder further including drive means for moving said ribbon across said one surface of the printing medium at a predetermined speed corresponding to the rate at which characters are recorded.

10. The recorder defined in claim 9 wherein said drive means includes supply and take-up reels rotatably mounted adjacent the sides of the printing medium and having said ribbon wound thereon and extending therebetween across the printing medium, said drive means also including motor means for rotating at least one of said reels to move said ribbon at the predetermined speed.

11. A recorder for printing information on an electrochemical printing medium in response to a plurality of applied electrical signals representing the information, said recorder comprising: a ribbon made of an insulative material and having partially imbedded therein a corresponding plurality of wire electrodes extending longitudinally between the ends of said ribbon, said ribbon being positioned in such a manner that said wire electrodes are contiguous to one surface of the printing medium; electrode apparatus including a rotatably mounted cylinder and a skewed electrode mounted on the surface of said cylinder between the directrices thereof, said cylinder being positioned contiguously to the other surface of the printing medium and oriented in such a manner that the portion of said skewed electrode nearest the other surface forms a corresponding plurality of points of intersection with said wire electrodes, the rotation of said cylinder causing said points of intersection to scan the printing medium during each revolution of said cylinder; and means for producing potential differences between said skewed and wire electrodes that vary in accordance with the applied electrical signals, said potential differences being effective to cause correspondingly varying currents to flow between said skewed and wire electrodes at their points of intersection, whereby visible metal salts of correspondingly varying density are formed on the printing medium in the form of the information to be recorded.

12. The recorder as defined in claim 11, said recorder further including drive means for moving said ribbon across said one surface of the printing medium at a predetermined speed corresponding to the rate at which information is recorded.

13. The recorder defined in claim 12 wherein said drive means includes supply and take-up reels rotatably mounted adjacent the sides of the printing medium and having said ribbon wound thereon and extending therebetween across the printing medium, said drive means also including motor means for rotating at least one of said reels to move said ribbon at the predetermined speed.

14. A recorder for printing characters on an electrochemical printing medium in response to applied electrical signals representing the information, said recorder comprising: a ribbon made of an insulative material and having partially imbedded therein a plurality of wire electrodes extending longitudinally between the ends of said ribbon, said ribbon being positioned in such a manner that said wire electrodes are contiguous to one surface of the printing medium; an electrode assembly positioned contiguous to the other side of the printing medium at each character space available in a line thereon, each such assembly including a plurality of electrodes oriented in such a manner relative to said wire electrodes as to form a printing matrix therewith; first means for selectively energizing said wire electrodes in accordance with the applied electrical signals; and second means for selecting said electrode assemblies in sequence and sequentially energizing the plurality of electrodes in the selected electrode assembly, the energization of said electrodes being synchronized with the energization of said wire electrodes, whereby visible metal salts are formed at the selected character space on the printing medium in the form of the character to be printed.

15. The recorder defined in claim 14 wherein said first means includes a signal source having a plurality of output terminals equal in number to said plurality of wire electrodes and operable in response to the applied electrical signals for selectively producing permutations of voltage pulses at said output terminals corresponding to the characters to be recorded, said first means further including additional means for electrically coupling said wire electrodes to the output terminals, respectively, of the signal source.

16. The recorder as defined in claim 14, said recorder further including drive means for moving said ribbon across said one surface of the printing medium at a predetermined speed corresponding to the rate at which characters are recorded.

17. The recorder defined in claim 16 wherein said drive means includes supply and take-up reels rotatably mounted adjacent the sides of the printing medium and having said ribbon wound thereon and extending therebetween across the printing medium, said drive means also including motor means for rotating at least one of said reels to move said ribbon at the predetermined speed.

18. A recorder for printing information on an electrochemical printing medium in response to applied electrical signals representing the information, said recorder comprising: a ribbon made of an insulative material and having partially imbedded therein a plurality of wire electrodes extending longitudinally between the ends of said ribbon, said ribbon being positioned in such a manner that said wire electrodes are contiguous to one surface of the printing medium; electrode apparatus including a rotatably mounted cylinder and a skewed electrode mounted on the surface of said cylinder between the directrices thereof, said cylinder being positioned contiguously to the other surface of the printing medium and oriented in such a manner that the portion of said skewed electrode nearest the other surface forms a corresponding plurality of points of intersection with said wire electrodes, the rotation of said cylinder causing said points of intersection to scan the printing medium during each revolution of said cylinder; first means for energizing said wire electrodes in accordance with the applied electrical signals; and second means for continuously energizing said skewed electrode at a fixed predetermined level, whereby varying amounts of visible metal salts are deposited on the printing medium during each scan thereof to record the desired information.

19. The recorder defined in claim 18 wherein said first means includes a signal source having a plurality of output terminals whereat the applied electrical signals are produced, the output terminals being equal in number to said plurality of wire electrodes, said first means further including additional means for electrically coupling said wire electrodes to the output terminals, respectively, of the signal source.

20. The recorder as defined in claim 18, said recorder further including drive means for moving said ribbon across said one surface of the printing medium at a predetermined speed corresponding to the rate at which information is recorded.

21. The recorder defined in claim 20 wherein said drive means includes supply and take-up reels rotatably mounted adjacent the sides of the printing medium and having said ribbon wound thereon and extending therebetween across the printing medium, said drive means also including motor means for rotating at least one of said reels to move said ribbon at the predetermined speed.

References Cited in the file of this patent

UNITED STATES PATENTS

| | | |
|---|---|---|
| 1,130,020 | Ramsey | Mar. 2, 1915 |
| 2,610,102 | Gitzendanner et al. | Sept. 9, 1952 |
| 2,615,777 | Deuth | Oct. 28, 1952 |
| 2,743,989 | Clurman et al. | May 1, 1956 |
| 2,776,181 | Alden | Jan. 1, 1957 |
| 2,819,941 | Hell | Jan. 14, 1958 |